United States Patent [19]

Kennedy et al.

[11] Patent Number: 5,022,507
[45] Date of Patent: Jun. 11, 1991

[54] ANTI-FLOWBACK CHECK VALVE FOR A VISCOUS FLUID CLUTCH

[75] Inventors: Lawrence C. Kennedy, Kettering; Harvey J. Lambert, West Milton, both of Ohio

[73] Assignee: General Motors Corporation, Detroit, Mich.

[21] Appl. No.: 553,017

[22] Filed: Jul. 16, 1990

[51] Int. Cl.$^5$ ............................................. F16D 31/00
[52] U.S. Cl. ................................. 192/58 B; 192/82 T
[58] Field of Search .......................... 192/58 B, 82 T; 123/41.12

[56] References Cited

U.S. PATENT DOCUMENTS

| | | | |
|---|---|---|---|
| 3,174,600 | 3/1965 | Oldberg | 192/58 B |
| 3,339,689 | 9/1967 | Sutaruk | 182/58 B |
| 3,559,786 | 2/1971 | Long | 192/58 |
| 3,648,811 | 3/1972 | LaFlame | 192/58 B |
| 4,064,980 | 12/1977 | Tinholt | 192/58 B |
| 4,086,990 | 5/1978 | Spence | 192/58 B |
| 4,188,785 | 2/1980 | Ando et al. | 192/58 B |
| 4,312,433 | 1/1982 | Bopp | 192/58 B |
| 4,544,053 | 11/1985 | Yamaguchi et al. | 192/58 B |
| 4,564,094 | 1/1986 | Storz | 192/58 B |
| 4,606,445 | 8/1986 | Rockey | 192/58 B |
| 4,683,999 | 8/1987 | Light et al. | 192/58 B |
| 4,924,987 | 5/1990 | Kennedy | 192/58 B |
| 4,930,457 | 1/1990 | Tamai | 192/82 T |
| 4,938,328 | 7/1990 | Kennedy | 192/58 B |

OTHER PUBLICATIONS

Lawrence C. Kennedy and Ronald G. Huth, USSN 07/459,406 filed Dec. 29, 1989, "Pressure-Responsive Fluid Check Valve and Method for a Viscous Fluid Clutch".

Primary Examiner—Allan D. Herrmann
Assistant Examiner—Andrea Pitts
Attorney, Agent, or Firm—A. Michael Tucker

[57] ABSTRACT

A viscous fluid fan clutch assembly for a vehicle includes an internally-mounted pump plate for separating a working chamber from a reservoir. A plurality of discharge orifices are provided in the pump plate to permit the return of fluid from a pumping chamber to the reservoir. A fluid discharge channel is provided for each discharge orifice to receive fluid exiting the pumping chamber and to direct the fluid to an inner portion of the reservoir. A check valve is provided at the discharge channel to prevent the flowback of fluid from the reservoir to the discharge channel, particularly when the clutch assembly is not in operation.

4 Claims, 3 Drawing Sheets

ANTI-FLOWBACK CHECK VALVE FOR A VISCOUS FLUID CLUTCH

BACKGROUND OF THE INVENTION

1. Field of the Invention

The present invention relates generally to a viscous fluid coupling device In particular, the present invention is concerned with an anti-flowback check valve for a viscous fluid clutch.

2. Statement of the Related Art

A thermostatically-controlled viscous fluid clutch assembly for driving and rotating a vehicle cooling fan is well-known. A multi-bladed fan is removably secured to a body of the clutch assembly. The fan and clutch assembly are installed between an accessory pulley of a vehicle engine (typically the water pump pulley) and a radiator. The clutch assembly drives the fan at high speeds close to input speed when cooling is required and permits the fan to rotate at low speeds when cooling is not required. Thermostatic control of the fan through the clutch assembly reduces the airflow noise caused by fan rotation and the load of an engine, resulting in horsepower gain and improved fuel economy.

Generally, a clutch plate, housed within the clutch assembly, having lands and grooves is mated to the body having complementary lands and grooves. A pump plate divides the assembly into a pair of internally-contained chambers, a working chamber and a reservoir. Gates in the pump plate permit selective flow of a viscous fluid from the reservoir to the working chamber and into a shear zone between the lands and grooves of the body and clutch plate. Fluid shear in the lands and grooves transfers input torque from the clutch plate to drive the body and the attached fan.

When cooling is not required, gates in the pump plate are closed and the fluid in the shear zone is pumped into a pumping chamber. Orifices in the pump plate permit passage of the fluid from the pumping chamber into the reservoir. The removal of a majority of the fluid from the shear zone substantially reduces the shear between the clutch plate and the body, thereby substantially reducing the rotation of the fan.

When an engine is not running, fluid in the reservoir may settle at an equilibrium level in a conventional clutch assembly. Fluid pressure may cause the migration of fluid from the reservoir into the pumping chamber through the pump plate orifices and into the shear zone. When an engine is next started, fluid that has migrated into the shear zone results in annoying high-speed operation of the fan. Such high-speed operation creates unwanted airflow noise from the fan blades. Also, excessive rotation of the fan of a cold engine increases the engine warm-up period.

The art continues to seek improvements. It is desirable that a viscous fluid clutch assembly provide thermostatic operation of a fan when cooling is required. Furthermore, it is desirable that a clutch assembly prevent the migration of fluid from a reservoir to the shear zone when the engine is not in operation, thereby eliminating high-speed operation and unwanted airflow noise when a cold engine is started.

SUMMARY OF THE INVENTION

The present invention includes a viscous fluid drive device particularly adaptable for a fan clutch assembly of a vehicle. The present fan clutch assembly utilizes a check valve mounted in a fluid discharge channel to prevent the migration of fluid from a reservoir into a pumping chamber, particularly when the engine is not running.

In preferred embodiments, the present invention includes a viscous fluid fan clutch assembly for a vehicle. The clutch assembly includes an internally-mounted pump plate for separating a working chamber from a reservoir. A plurality of discharge orifices are provided in the pump plate to permit the return of fluid from a pumping chamber to the reservoir. A fluid discharge channel is provided for each discharge orifice to receive fluid exiting the pumping chamber and to direct the fluid to an inner portion of the reservoir. A check valve is provided at the discharge channel to prevent the flowback of fluid from the reservoir to the discharge channel, particularly when the clutch assembly is not in operation.

DETAILED DESCRIPTION OF THE PREFERRED EMBODIMENTS

Figure 1:
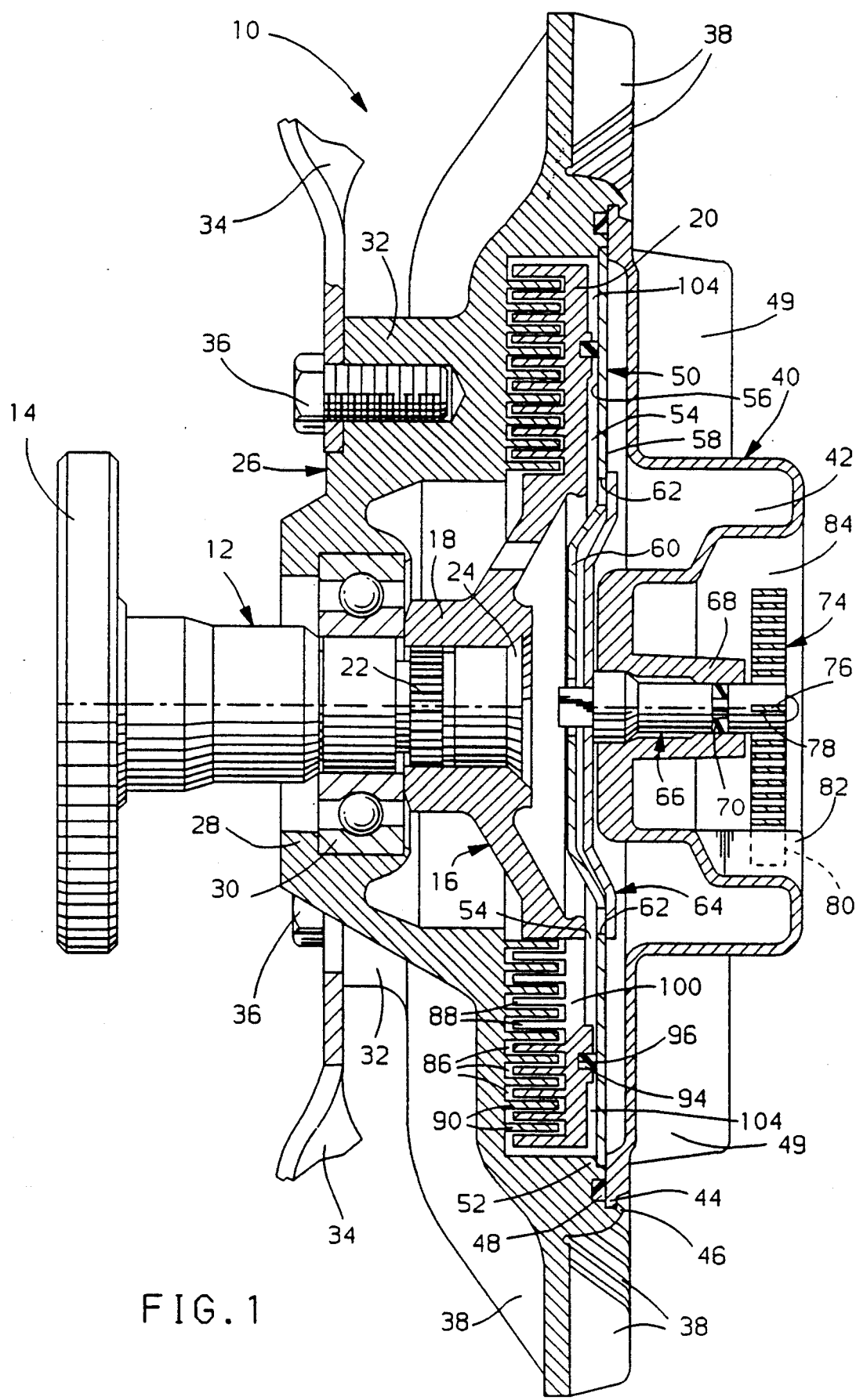
FIG. 1 is an axial sectional view of a viscous fluid clutch assembly and attached fan according to the present invention, wherein a viscous fluid has been removed for purposes of clarity of illustration.

A viscous fluid clutch assembly indicated generally at 10 is illustrated in FIG. 1. The clutch assembly 10 includes a rotatably driven input shaft indicated generally at 12. The input shaft 12, which can be provided with multiple steps as illustrated in FIG. 1, preferably terminates at its first or innermost end in a flange 14. The flange 14 can be secured to a conventional engine-driven water pump pulley (not illustrated) to drive the clutch assembly 10 as described below.

A clutch plate indicated generally at 16 includes a central hub portion 18 and an annular disk portion 20. The central hub portion 18 receives a knurled portion 22 of the input shaft 12 to secure the clutch plate 16 onto the input shaft 12. In this construction, the rotational drive of the input shaft 12 is transferred to the clutch plate 16. A second end of the input shaft 12 can be machined as indicated at 24 to retain the clutch plate 16 on the input shaft 12. It is appreciated that other constructions, e.g., splining, can be utilized to drivingly connect the clutch plate 16 with the input shaft 12.

A housing indicated generally at 26 is a dished member having a central hub 28 rotatably mounted on the input shaft 12 by a bearing 30. A plurality of radially extending bosses 32 are formed on an exterior face of the housing 26. A multi-bladed fan 34, partially illustrated in FIG. 1, is attached by threaded fasteners 36 to the bosses 32. A plurality of fins 38 is provided on the outer surface of the housing 26 to dissipate heat transferred from a viscous fluid (not illustrated in FIG. 1) contained by the assembly 10.

A cover indicated generally at 40 is mounted to a front face of and cooperates with the housing 26 to form a reservoir 42 for the viscous fluid as described below. The cover 40 is a dished member having an annular outer edge 44 secured to the housing 26 by an annular retainer lip 46 spun over from the material of the housing 26. An annular seal 48, e.g., a formed-in-place gasket, is interposed between the edge 44 and a front face of the housing 26 to prevent leakage from the interior of the assembly 10. A plurality of fins 49 is provided on an outer surface of the cover 40 to dissipate heat transferred from the fluid.

A disk-like pump plate indicated generally at 50 is installed in the interior of the assembly 10. The pump plate 50 is positioned on a shoulder 52 of the housing 26 and is drivingly secured to the housing 26 by the cover 40. The pump plate 50 divides the interior of the assembly 10 into a working chamber 54 and the fluid reservoir 42. In the view of FIG. 1, the working chamber 54 is the interior volume of the assembly 10 to the left of the pump plate 50, while the reservoir 42 is the interior volume to the right of the pump plate 50. For purposes of this specification, a first or rear surface 56 of the pump plate 50 is in communication with the working chamber 54 and a second or front surface 58 of the pump plate 50 is in communication with the reservoir 42. The pump plate 50 includes a central depression 60 which is fitted in the hub portion 18 of the clutch plate 16.

A pair of diametrically-opposed gates or ports 62 are provided in a portion of the pump plate 50 radially outbound of the depression 60. Hydraulic pressure causes the flow of fluid through the gates 62 from the reservoir 42 into the working chamber 54.

A rotatable control arm 64 controls the flow of fluid into the working chamber 54 by covering and uncovering the gates 62. The control arm 64 is drivingly connected to a shaft 66, which is rotatably mounted in a tubular hub 68 formed in the cover 40. An 0-ring seal 70 is mounted in an annular groove in the shaft 66 and makes peripheral contact with the inner wall of the hub 68 to prevent fluid leakage to the exterior of the assembly 10.

A bimetallic coil 74 is mounted at a first end 76 in a slot 78 on the forward end of the shaft 66. A second end 80 of the bimetallic coil 74 is mounted in a tab 82 in the exterior of the cover 40. Preferably, the bimetallic coil 74 is recessed within a cavity 84 surrounding the hub 68. The bimetallic coil 74 responds to the ambient air temperature surrounding the cover 40. An increase in air temperature causes the coil 74 to expand, thereby rotating the shaft 66 and the control arm 64 to uncover the gates 62 in the pump plate 50. When the air temperature has decreased to a predetermined level, the bimetallic coil 74 contracts, causing the shaft 66 and control arm 64 to rotate back to their original positions, thereby covering the gates 62 in the pump plate 50 and blocking fluid flow.

A fluid shear zone 86 (FIGS. 1 and 2) is formed by the space between the interleaved concentric annular lands or ridges 88 and grooves formed on a rear or inner surface of the disk portion 20 of the clutch plate 16 and corresponding concentric annular lands or ridges 90 and grooves formed on an interior surface of the housing 26. Fluid sheared in the shear zone 86 transmits input torque from the rotatably driven clutch plate 16 to provide hydraulic drive of the housing 26 and the attached fan 34.

Figure 2:
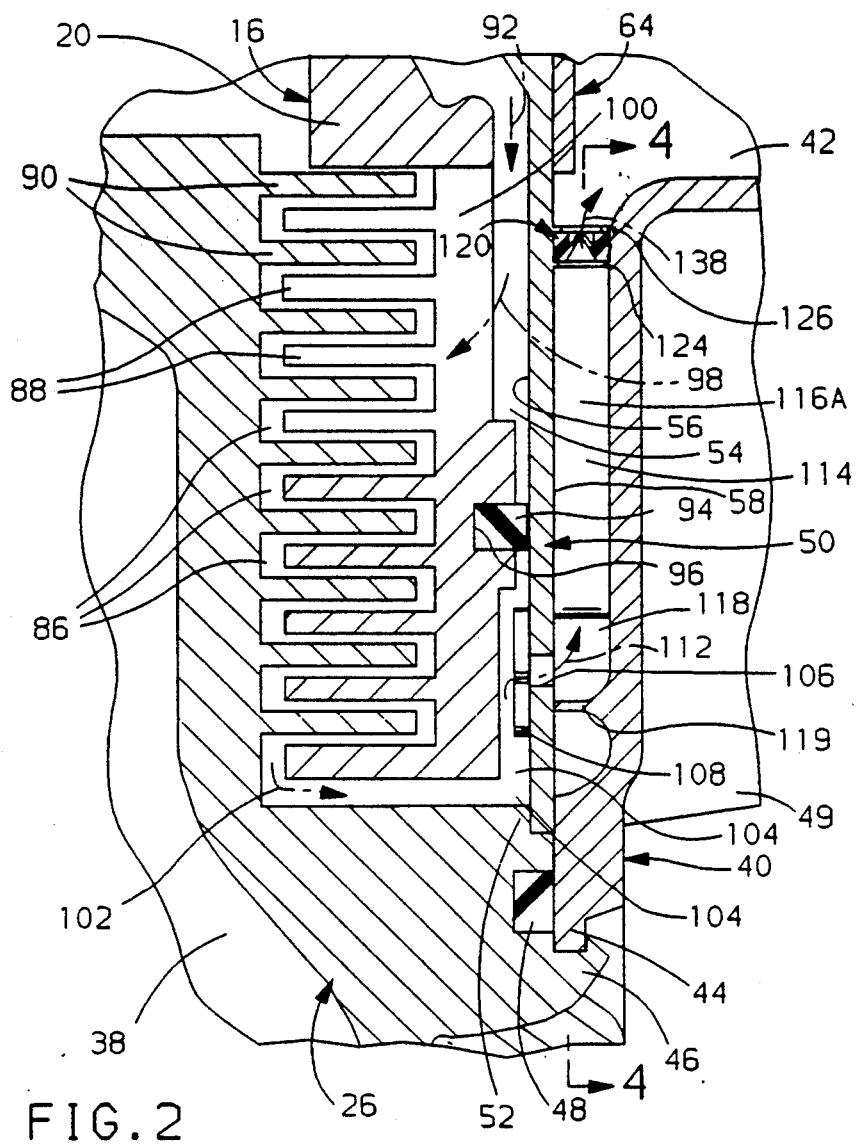
FIG. 2 is an enlarged view of a portion of the clutch assembly of FIG. 1 wherein the housing, the pump plate and the cover have been rotated to illustrate fluid flow from a pumping chamber through a discharge orifice, a discharge channel and a first embodiment of a check valve to a reservoir.

Fluid flow through the shear zone 86 is illustrated in FIG. 2 with directional arrows. When the control arm 64 is rotated to uncover the gates 62, fluid flows from the reservoir 42 into the working chamber 54. Centrifugal forces of the rotating clutch assembly 10 direct the fluid into a radial flow as indicated at directional arrow 92 between the pump plate 50 and the clutch plate 16. A blocking ring 94, preferably formed from TEFLON or a similar material, is provided in an annular groove 96 in a front surface of the clutch plate 16. Radial flow 92 encounters the blocking ring 94 and is redirected to axial flow indicated at directional arrow 98 to flow through a plurality of passages 100 provided in the ridges 88 and grooves of the clutch plate 16. Centrifugal forces cause the fluid to be dispersed radially outwardly throughout the shear zone 86. Fluid friction in the shear zone 86 transmits the rotation of the clutch plate 16 to the housing 26. As the housing 26 rotates, the attached fan 34 is rotated to draw cooling air through a radiator (not illustrated) and cool an internal combustion engine in a well-known manner.

Fluid exits the shear zone 86 as indicated at directional arrow 102 into an annular pumping chamber 104 formed and bounded by the clutch plate 16, the pump plate 50 and the blocking ring 94.

Figure 3:
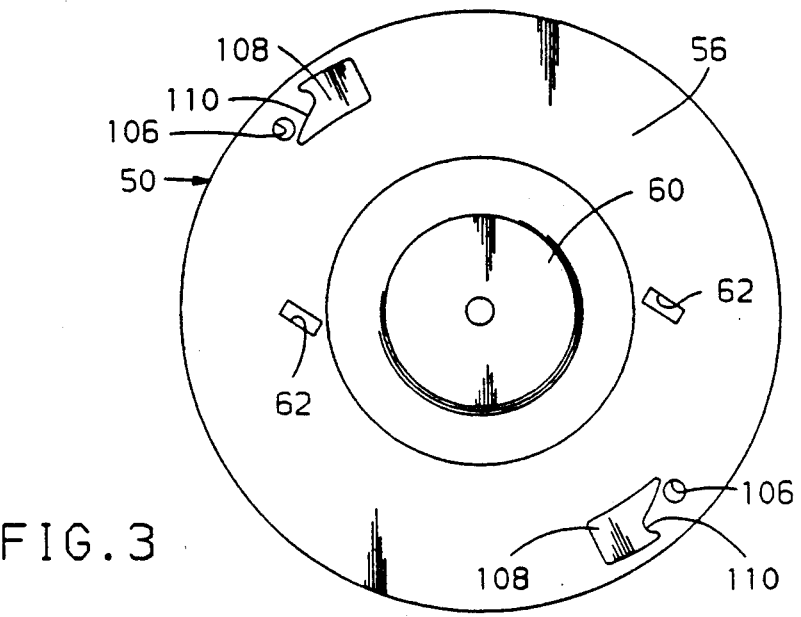
FIG. 3 is a reduced rear elevational view of the pump plate removed from the clutch assembly of FIG. 1 for purposes of clarity of illustration, illustrating a pair of discharge orifices and respective wipers.

A pair of diametrically opposed discharge orifices 106 are provided radially outwardly from the gates 62 as illustrated best in FIG. 3. To improve pumping efficiency, a well-known wiper 108 can be mounted on the rear surface 56 of the pump plate 50 adjacent each discharge orifice 106. The wiper 108 can include a scoop surface 110 and is mounted upstream of the discharge orifice 106. From the orientation of FIG. 3, a counter-clockwise rotation of the pump plate 50 forces fluid into the scoop surface 110, thereby increasing fluid pressure in the pumping chamber 104 and fluid flow through the discharge orifice 106, as indicated at directional arrow 112 in FIG. 2. In other embodiments, the wiper 108 can be formed by any suitable means, e.g., as a projecting element stamped or pressed into the pump plate 50.

Figure 4:
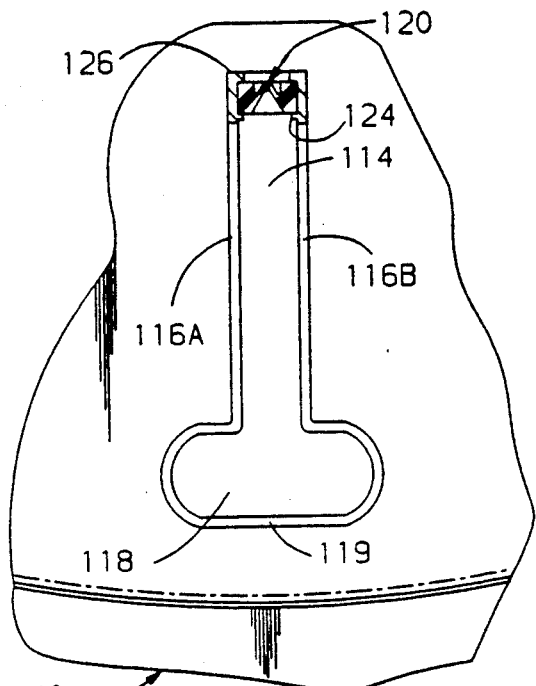
FIG. 4 is a partial elevational view taken along line 4—4 of FIG. 2 of an inner surface of a cover of the clutch assembly illustrating a fluid discharge channel and a first embodiment of a check valve for preventing the flowback of fluid from the reservoir into the discharge channel.

As fluid exits each discharge orifice 106, it enters a discharge channel 114 provided on an inner surface of the cover 40 as illustrated in FIGS. 2 and 4. Preferably, the discharge channel 114 is formed by a pair of side walls 116A, 116B cast into the cover 40. Preferably, an accumulator portion 118 of the discharge channel 114 resembling an oval or oblong chamber is formed adjacent the discharge orifice 106. Walls 116A, 116B terminate at their radially outermost ends at a wall 119 which forms the accumulator portion 118. Fluid accumulates or collects in the accumulator portion 118 and is then forced radially inwardly along the length of the discharge channel 114 through a check valve indicated generally at 120 mounted adjacent an inner portion of the fluid reservoir 42.

Figure 5:
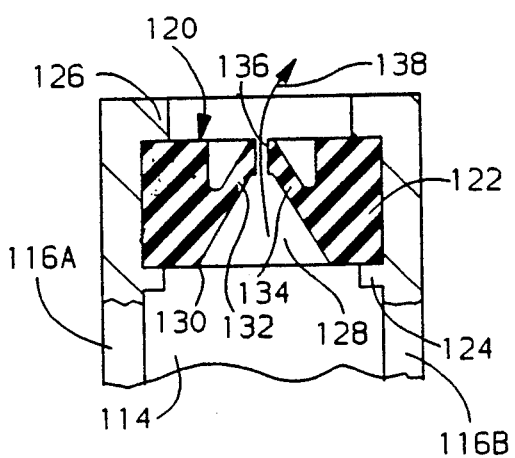
FIG. 5 is an enlarged view of the check valve of FIG. 4 mounted at the radially innermost end of the fluid discharge channel illustrating one-way fluid flow through the valve into the reservoir.

The check valve 120, illustrated best in FIG. 5, comprises a resilient, generally rectangular body 122 fitted between stops 124, 126 provided at the radially innermost ends of the walls 116A, 116B. An interior chamber 128 having an inlet 130 in communication with the discharge channel 114 is provided in the body 122. The interior chamber 128 includes a pair of angled side walls 132, 134 which terminate in a normally-closed outlet 136. When the fluid pressure in the discharge channel 114 reaches a predetermined level, fluid in the interior chamber 128 forces the side walls 132, 134 apart so that fluid can flow through the outlet 136 as indicated by directional arrow 138 in FIGS. 2 and 5.

The present check valve 120 is responsive to fluid pressure and operates during the entire operating temperature range of the fluid. The opening and closing of the normally-closed outlet 136 is a function of pressure in the discharge channel 114, and is not related to the pressure in the reservoir 42. Upon the application of a predetermined fluid pressure to the side walls 132, 134, the outlet 136 opens. When the pressure is reduced to a predetermined level, the outlet 136 closes. Since the outlet 136 does not require any fluid pressure from the reservoir 42 to close, the check valve 120 can be referred to as a zero-pressure-to-close valve.

Figure 6:
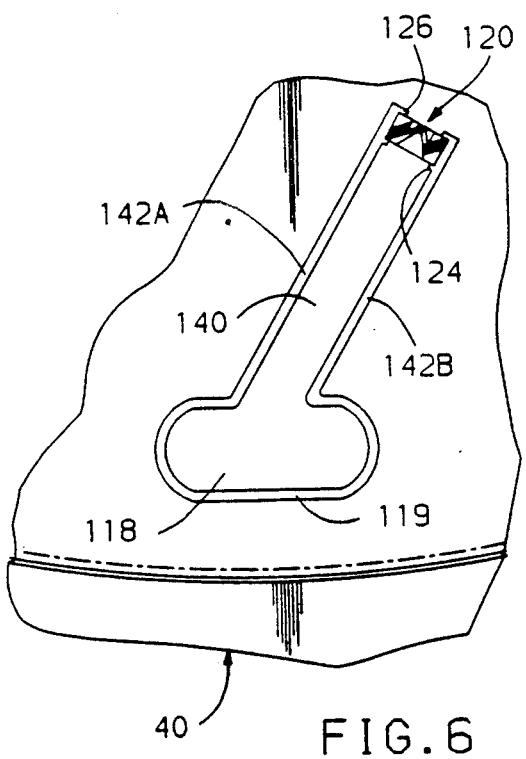
FIG. 6 is a view similar to FIG. 4 wherein an angled discharge channel is provided on the inner surface of the cover.

As illustrated in FIG. 6, an angled discharge channel 140 can be provided by casting the side walls 142A, 142B at a preselected angle relative to side walls 116A, 116B of FIG. 4. This angular configuration takes advantage of the rotational momentum input to the fluid during operation of the clutch assembly 10 and assists in the pump-out of fluid through the discharge channel 140 and check valve 120 to the inner portion of the reservoir 42.

Figure 7:
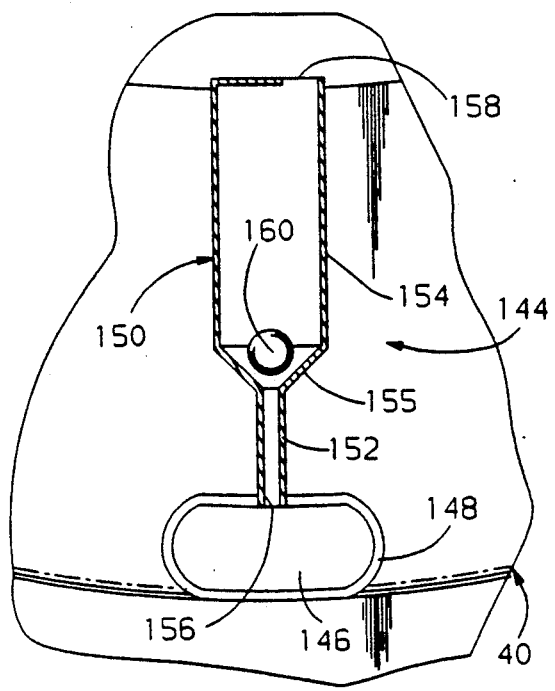
FIG. 7 is a view similar to FIG. 4 illustrating a second embodiment of a check valve comprising a tube and ball assembly to prevent the flowback of fluid into the discharge channel.

A second embodiment of a discharge channel and check valve assembly is indicated at 144 and illustrated in FIG. 7. An accumulator portion 146 is formed as an oval or oblong chamber by a wall 148 cast in the inner surface of the cover 40. A groove (not illustrated) is provided in the inner surface and seats a tube assembly 150 having a first or lower circular cross section portion 152 and a second or upper generally rectangular cross section portion 154 connected by a conical portion 155. The first portion 152 includes an inlet 156 in fluid communication with the accumulator portion 146. The second portion 154 includes an outlet 158 in fluid communication with the reservoir 42. A ball 160 is mounted in the second portion 154 of the tube assembly 150 and has a diameter greater than the diameter of the first portion 152 of the tube assembly 150. Furthermore, the ball 160 has a greater specific gravity than the viscous fluid contained in the clutch assembly 10.

During operation, fluid pressure in the accumulator portion 146 unseats the ball 160 from the first portion 152 so that fluid can travel through the second portion 154 to the reservoir 42. When the clutch assembly 10 is not operating and when a discharge orifice 106 comes to rest below the level of the fluid of the clutch assembly 10, the ball 160 drops downwardly due to gravity and covers the first portion 152 of the tube assembly 150, thereby preventing the migration or flowback of fluid from the reservoir 42 into the accumulator portion 146.

The present check valves 120 and 160 provide economical and effective means for preventing the migration of fluid from the reservoir 42 back into the pumping chamber 104 and the shear zone 86. The prevention of fluid migration back into the shear zone 86 eliminates undesirable, high-speed clutch operation when a cold engine is started, thereby significantly reducing airflow noise created by the fan 34.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A viscous fluid clutch assembly comprising:
   (a) a clutch plate rotatably driven by an input shaft;
   (b) housing means having a hollow interior rotatably mounted on the input shaft;
   (c) a shear zone disposed between the clutch plate and the housing means;
   (d) a pump plate mounted internally in the housing means for dividing the interior of the housing means into a fluid reservoir and a working chamber, wherein the shear zone is disposed in the working chamber;
   (e) discharge orifices provided in the pump plate for returning fluid from the working chamber to the fluid reservoir;
   (f) a discharge channel provided in the housing means for receiving fluid exiting from each discharge orifice and directing the fluid to an inner portion of the fluid reservoir; and
   (g) check valve means provided in each discharge channel to prevent migration of fluid from the reservoir into the discharge channel, the check valve means comprising a pressure-responsive check valve having
      (i) a resilient body;
      (ii) a chamber provided in the body having an inlet in communication with the discharge channel; and
      (iii) a pair of angled side walls in the chamber terminating in a normally-closed outlet in communication with the reservoir,
   whereby when a predetermined fluid pressure is reached in the discharge channel, the side walls are forced apart to open the outlet, and when the fluid pressure falls below the predetermined level, the side walls return to their original position to close the outlet.

2. The clutch assembly as specified in claim 1 including a fluid accumulator in each discharge channel provided adjacent a respective discharge orifice.

3. A viscous fluid clutch assembly comprising:
   (a) a clutch plate rotatably driven by an input shaft;
   (b) housing means having a hollow interior rotatably mounted on the input shaft;
   (c) a shear zone disposed between the clutch plate and the housing means;
   (d) a pump plate mounted internally in the housing means for dividing the interior of the housing means into a fluid reservoir and a working chamber, wherein the shear zone is disposed in the working chamber;
   (e) discharge orifices provided in the pump plate for returning fluid from the working chamber to the fluid reservoir;

(f) a discharge channel provided in the housing means for receiving fluid exiting from each discharge orifice and directing the fluid to an inner portion of the fluid reservoir; and (g) check valve means provided in each discharge channel to prevent migration of fluid from the reservoir into the discharge channel, means comprising (i) a tube having a first portion inserted into and in fluid communicating with the discharge channel; and (ii) a second portion containing a ball valve in fluid communication with the reservoir, whereby when the fluid pressure in the discharge channel reaches a predetermined level, the ball valve is unseated to permit the flow of fluid from the discharge channel into the reservoir, and when the fluid pressure falls below the predetermined level, the ball valve is seated to prevent the flow of fluid from the reservoir into the discharge channel.

4. The clutch assembly as specified in claim 3 including a fluid accumulator in each discharge channel provided adjacent a respective discharge orifice.

* * * * *